US007309227B2

(12) United States Patent
Pierson et al.

(10) Patent No.: US 7,309,227 B2
(45) Date of Patent: Dec. 18, 2007

(54) POLYMERIC INJECTION MOLD WITH RETRACTABLE BARS FOR PRODUCING RE-ENTRANT MOLDED SURFACES

(76) Inventors: Theodore J. Pierson, 817 W. Shore Dr., Kinnelon, NJ (US) 07405; Richard J. Carle, 1450 Washington Valley Rd., Bridgewater, NJ (US) 08807

( * ) Notice: Subject to any disclaimer, the term of this patent is extended or adjusted under 35 U.S.C. 154(b) by 281 days.

(21) Appl. No.: 11/209,315

(22) Filed: Aug. 23, 2005

(65) Prior Publication Data

US 2007/0054006 A1    Mar. 8, 2007

(51) Int. Cl.
*B29C 45/44*    (2006.01)
(52) U.S. Cl. .................. 425/441; 425/556; 425/577; 425/DIG. 58
(58) Field of Classification Search .............. 249/66.1; 425/441, 444, 556, 577, DIG. 58
See application file for complete search history.

(56) References Cited

U.S. PATENT DOCUMENTS

| 3,910,748 | A | 10/1975 | Kopernik | 425/444 |
| 4,362,291 | A | 12/1982 | Fuke et al. | 249/144 |
| 4,495,135 | A | 1/1985 | White | 264/553 |
| 4,678,158 | A | 7/1987 | Brock | 249/161 |
| 4,731,014 | A | 3/1988 | Von Holdt | 425/556 |

(Continued)

FOREIGN PATENT DOCUMENTS

JP        09-155926       6/1997

(Continued)

OTHER PUBLICATIONS

Plastic Injection Moulding-An Introduction' at http://www.azom.com/details.asp?ArticleID=265, Jan. 7, 2005.

(Continued)

*Primary Examiner*—Tim Heitbrink
*Assistant Examiner*—Emmanuel S Luk
(74) *Attorney, Agent, or Firm*—Ernest D. Buff & Associates, LLC; Ernest D. Buff; Theodore J. Pierson (57)    ABSTRACT

A polymeric injection mold has stationary and movable parts mating at a parting line. The polymeric part has one or more re-entrant surfaces on both sides of the parting line, wherein the re-entrant surfaces are defined by slide bar projections inserted into the mold. The slide bar projections are attached to slide bars that pass through tapered slots in the side walls of the stationary and movable sides of the mold and are inclined at an angle to the centerline of the mold. The slide bars of the stationary side of the mold are removably connected to pull bars, wherein the pull bars are rigidly attached at their opposite ends to the movable side of the mold. When the movable side of the mold is withdrawn, the injection molded part is pulled out of the stationary side of the mold when the slide bar projections clear the re-entrant surfaces.

18 Claims, 4 Drawing Sheets

U.S. PATENT DOCUMENTS

| | | | |
|---|---|---|---|
| 4,854,849 A * | 8/1989 | Sudo | 425/556 |
| 5,137,442 A * | 8/1992 | Starkey | 425/438 |
| 5,219,594 A * | 6/1993 | Meyer et al. | 425/577 |
| 5,252,057 A | 10/1993 | Landstorfer | 425/556 |
| 5,551,864 A * | 9/1996 | Boskovic | 425/556 |
| 5,814,357 A * | 9/1998 | Boskovic | 425/556 |
| 5,882,568 A | 3/1999 | Kashiwagi | 264/275 |
| 6,039,558 A * | 3/2000 | Park et al. | 425/556 |
| 6,235,231 B1 * | 5/2001 | Martin | 264/328.1 |
| 6,474,977 B1 * | 11/2002 | Wimmer | 425/556 |
| 6,491,513 B1 * | 12/2002 | Schneider | 425/577 |
| 6,537,053 B1 * | 3/2003 | Watkins | 425/190 |
| 6,655,952 B1 * | 12/2003 | Kraft | 425/556 |
| 2003/0113399 A1 | 6/2003 | Urbanek | 425/589 |
| 2003/0147989 A1 | 8/2003 | Kasai et al. | 425/593 |
| 2005/0042322 A1 * | 2/2005 | Takao | 425/443 |

FOREIGN PATENT DOCUMENTS

| | | |
|---|---|---|
| JP | 2003/071876 | 6/2002 |
| JP | 2002/172662 | 3/2003 |

OTHER PUBLICATIONS

Injected Molded Tooling Specification' at http://fordpkgstd.com/discus/messages/9/914.html?1064854717, Nov. 23, 2003.

Turner, Ryan Anthony, *Tapered LIGA Mold Insert*, Louisiana State University, 2001 thesis.

* cited by examiner

POLYMERIC INJECTION MOLD WITH RETRACTABLE BARS FOR PRODUCING RE-ENTRANT MOLDED SURFACES

BACKGROUND OF THE INVENTION

1. Field of the Invention

The present invention relates to a polymeric injection mold for producing re-entrant molded surfaces and more particularly to a molding process and device for producing a molded article having re-entrant surfaces.

2. Description of the Prior Art

Many patents address issues related to injection molding of polymeric articles. The patents and publications that relate to polymeric injection molding with re-entrant surfaces are discussed hereinbelow.

U.S. Pat. No. 3,910,748 to Kopernik discloses plastic mold construction in which foamed thermoplastic articles, particularly elongated boards can be produced at a high rate of production. The mold may be selectively provided with different ornamental surface designs. The mold comprises a stationary match plate member and one or more movable plate members arranged for cooperation with the stationary match plate. One or more elongated ejector bars are slidably arranged to extend the entire length of the stationary match plate and when retracted within the stationary plate, an edge of ejector bar serves as part of the mold. Coordinated impact means dislodge the molded part from adherence to the ejector bar. When the board-like member is provided with an undercut, one or more rabbet mold parts are provided for selective but rigid securement during production by simple clamp means, to the stationary match plate. The disclosure is for elongated boards with ornamental surfaces. There is no disclosure of a mold construction for molding of polymeric articles with re-entrant surfaces.

U.S. Pat. No. 4,362,291 to Fuke et al. discloses a metal mold for molding a hollow article having inwardly tapered sidewall. The metal mold has a stationary bottom die plate, a core and a cavity plate surrounding the core. The core has a truncated pyramid shape and first and second slide cores are provided between the core and the cavity plate. The core and slide cores are constructed such that at the time of opening the mold both slide cores are moved inwardly in an interlocked relation, with retractive movement of the core thus enabling removal of the molded product. The metal mold is for molding a hollow article having inwardly tapered sidewall. The polymer is injected from the stationary bottom die. The hollow polymeric part has re-entrant surfaces defined by the cores. Several pin mechanisms as well as sliding elements have to move cooperatively to move the cores away so that the molded part can be removed. The mold requires a large number of parts to move cooperatively. In this invention, the re-entrant surface is entirely within the movable part of the die set. No re-entrant surfaces are present in the stationary part of the mold.

U.S. Pat. No. 4,495,135 to White discloses a method for forming a container having a re-entrant flange. A unitary, thermoformed container having an undercut or re-entrant seal flange is provided. The container is made in a molding method and apparatus in which a flange-forming portion has a short-stroke gate assembly that opens after the unitary, thermoformed container has been formed in order to provide an exit path away from the molding cavity to permit ready removal of the thermoformed container out of the molding cavity and its flange-forming portion. This method uses a short-stroke method for forming a thermoformed unitary container with undercut flange by longitudinally moving a web of thermoformable material over an undercut flange-forming member with a movable leading end that is at the upstream end of the molding cavity. The container is thermoformed with re-entrant undercut flange. The leading end of the molding cavity flange-forming member is opened and the body forming member and leading end forming member are separated. This is a thermoforming process of a sheet of polymer and is not an injection molding machine. The re-entrant flange is present in only one side of the separation line.

U.S. Pat. No. 4,678,158 to Brock discloses an injection mold including mold sidewall locking bars. The injection mold assembly includes a plurality of locking bars for securing the mold sidewalls in a closed position of the mold. The locking bars project from one mold plate and are positioned outwardly of the mold sidewalls and include ends adapted to engage the other mold plate when the mold is closed and to function as wedges preventing outward movement of the mold sidewalls. The first and second molding plates are locked by sidewalls when the mold is closed preventing their movement when the polymer is injected. There are no re-entrant surfaces in the mold.

U.S. Pat. No. 4,731,014 to VonHoldt discloses a rear opening mold. An injection mold comprises a cavity member and a core member relatively movable between open and closed positions to define a first parting line and a molding chamber between the core and cavity members in the closed position. A sprue aperture is provided, communicating with the molding chamber to provide molding compound to the chamber. The cavity member defines forward and rearward portions movable between open and closed positions and proportioned whereby objects molded in the molding chamber can be removed from between the forward and rear portions when the cavity member is in its open position. The '014 patent discloses a rear opening mold. In operation, the right side of the mold must be moved in order to collapse the outer core member. There is only one re-entrant edge facing the right side of the mold and none facing the left side of the mold. As a result, one side of the mold could be moved upon release of the outer core. The arrangement of the '014 invention requires a large number of actuation mechanisms to operate together to produce the polymeric molded part.

U.S. Pat. No. 4,854,849 to Sudo discloses an injection mold. The injection mold is provided for molding an article with an undercut at one end portion. The movable half of the mold has a slide core, which defines the inner surfaces of the end portion and the undercut. The slide core is divided at the portion defining the inner surfaces of the end portion and the undercut into a plurality of pieces. The slide core is moved in a direction perpendicular to the ejecting direction when the molded article is ejected from the mold. At least one of the pieces is adapted to be slid along an inclined surface, which is at an angle to the ejecting direction larger than the angle at which the inclined surface or surfaces for the other piece or pieces are to the ejecting direction. The molded part has only one re-entrant surface and is accommodated by the sliding movement of the core. The molded part does not have two opposing re-entrant surfaces from the parting line.

U.S. Pat. No. 5,252,057 to Landstorfer discloses an apparatus for ejecting moldings from an injection molding machine. An apparatus for ejecting a molding from an injection molding machine includes a linearly moveable ejector plate. The ejector plate has a reciprocatingly movable coupling device for connecting the ejector plate to a mold ejector plate in a form-locked and force-locked manner. The ejector plate also has a hydraulic cylinder having a movable coupling piston connected to a coupling rod. This coupling rod has a head end, which is insertable into the coupling sleeve of the mold ejector plate. The coupling rod is tubular within which an axially displaceable actuating rod is provided, while the actuating rod has a conically tapered front end. By displacement of the actuating rod relative to the coupling rod, the radially engaging head region of the coupling rod is widened by radially outwardly directed forces. Thus, in a coupled condition, the head ends of the coupling rod and the actuating rod are connected in form-locked and force-locked manner with the coupling sleeve so that all coupling play is prevented. Additionally, the tubular coupling rod is radially divisible and is provided with an annular chamber in the radially divisible region. An annular piston which is axially movable in the annular chamber is also provided on the actuating rod. The '057 disclosure has nothing to do with injection molding of re-entrant surfaces in a polymeric component.

U.S. Pat. No. 5,882,568 to Kashiwagi discloses a method and molding machine for manufacturing shaped articles comprised of polymeric material. A molding machine for manufacturing a shaped article is comprised of a polymeric material and formed in a mold cavity between first and second mold halves of a mold assembly. At least one spring-loaded ejector member is provided in the first mold half and serves to eject the shaped article therefrom. The ejector member is movable toward and away from the second mold half and operates when the two mold halves are being opened. At least one resilient member urges the ejector member toward the second mold half. The resilient member exerts a resilient force to the ejector member, which is smaller than a tightening force of the mold halves. A method for manufacturing a shaped article comprised of a polymeric material includes providing at least one ejector member in the first mold half of the molding machine such that as the mold halves are opened, the ejector member urges the insulator away from the first mold half in which the ejector member is disposed. In one embodiment, the insulator is ejected by use of an ejection member having a distal end that is curved, thereby minimizing damage to the composite insulator. The method and molding machine is for manufacturing shaped articles comprised of polymeric material. This method is particularly suited for a composite electric insulator of fiber reinforced plastic coated with injection molded silicone or EPDM. Due to stickiness of the silicone and EPDM composition ejectors and resilient members are used to separate the molded composite article from the top and bottom sections of the mold. There are no re-entrant surfaces within the molded article and the method is unsuitable for releasing non flexible rigid molded article, such as an injection molded polymeric article.

U.S. patent application Ser. No. 2003/0113399 to Urbanek discloses a. two-plate injection molding machine. A two-plate injection molding machine comprising a movable mold mounting plate and a stationary mold mounting plate and at most three bars passing through the edge region of the mold mounting plates, wherein the closing force is applied to the movable mold mounting plate by pull bars, wherein at least two corner regions of the mold mounting plates have pull bars passing there through. The '399 patent discloses a two-plate injection molding machine. It uses two or four pull bars to close the mold and apply required forces during injection molding. The pull bars are placed at the corners of the molding plates thereby providing sufficient room there in between. There is no disclosure regarding molding re-entrant surfaces in this patent application.

U.S. patent application Ser. No. 2003/0147989 to Kasai et al. discloses a die clamping unit of an injection molding machine. A stationary platen and link housing are coupled to each other through tie bars. A movable platen is coupled to a front surface of the link housing through a toggle mechanism. Two slide bars are fixed to the back surface of the movable platen and each slide bar extends in a parallel way from a back surface toward the moving direction of the movable platen. Two hollow shafts are each fixed to the front surface of the link housing so as to correspond to the slide bar. Each hollow shaft extends in a parallel way from a front surface toward the moving direction of the movable platen. Each respective slide bar is inserted into the inside of the corresponding hollow shaft to allow it to slide along the inside of the hollow shaft. The die of the injection mold is opened or closed by a toggle mechanism driven by a servomotor. This die clamping mechanism has nothing to do with molding re-entrant surfaces in a polymeric molded article.

Foreign Publication No. JP2002172662 to Akimoto et al. discloses a method for manufacturing injection molded article. The mold is maintained at a temperature of polymer crystallization temperature ±20 C and is cooled to 70° C. or lower to produce polymeric molded parts with good appearance. This patent disclosure has nothing to do with injection molding polymeric articles with re-entrant surfaces.

Foreign Publication No. JP2003071876 to Asai et al. discloses a mounting structure of stamper for mold for injection molding. The slide bars are used to prevent movement of the stampers due to the thermal expansion caused by the heat of the polymer. This patent disclosure has nothing to do with injection molding polymeric articles with re-entrant surfaces.

Foreign Publication No. JP2009155926 to Kubo et al. discloses an injection mold. The stationary part of a mold has a variable diameter gate to allow for changing resin flow rate especially when a higher melt index polymer is used. As a result, the mold does not have to be re-created when the higher melt index polymer is used. This patent disclosure has nothing to do with injection molding polymeric articles with re-entrant surfaces.

Internet Publication. 'Plastic Injection Moulding—An Introduction' at http://www.azom.com/details.asp?ArticleID=265 provides an introduction to various aspects of polymeric injection molding practice. The Plastic Injection Moulding Internet Publication discloses common practices in plastic injection molding. No disclosure is contained in the article for injection molding of articles with re-entrant surfaces.

Internet Publication. 'Injection Molded Tooling Specification' at http://www.fordpkgstd.com/discus/messages/9/914.html?1064854717 discloses injection molded tooling specifications for the production of hand held containers and dunnage used in shipping containers for the shipment of automotive parts. No disclosure is contained in the article for injection molding of articles with re-entrant surfaces.

There remains a need in the art for a polymeric injection mold with retractable bars for producing re-entrant molded surfaces, wherein the re-entrant surfaces are in both sides of the parting line requiring retractable bars to be provided in both the stationary and the movable parts of the mold assembly.

SUMMARY OF THE INVENTION

The present invention discloses a polymer injection mold for molding a polymeric injection molded part with one or more re-entrant surfaces on both sides of the parting line. The parting line of an injection mold is the mating line of the stationary part of the mold and the movable part of the mold. As used herein, the "stationary part", "stationary side" or "A side" of the mold is defined as the part of the mold being rigidly attached to the injection molding machine that delivers the plasticized polymer to the mold through a nozzle. As used herein, the "movable part", "movable side" or "B side" of the mold is defined as the part of the mold that is removably mated with the stationary part along the parting line. The surfaces of the polymeric injection mold are generally tapered towards the parting line so that the mold can be separated after the injected polymer has hardened. If this taper is not present, the mold cannot be easily separated. Significantly, the presence of re-entrant surfaces on both sides of the parting line prevents the separation of the mold. In the subject invention, the re-entrant surfaces are defined by slide bar projections that are incorporated within both the stationary and the movable part of the mold. These slide bar projections must clear the re-entrant surfaces in the hardened injection molded polymeric part prior to mold separation. The subject invention uses slide bars attached to slide bar projections that pass through rectangular slots in the side walls of both the stationary part and the movable part of the mold inclined at an angle with respect to the centerline of the mold. The movement of slide bars through the inclined rectangular slots displaces the slide bar projections thereby allowing them to clear the re-entrant surfaces of the injection molded polymeric part.

The clearance between the slide bars and the rectangular slots is small enough to prevent the leakage of the plasticized polymer. This clearance is typically in the range of 0.0005" to 0.001". Material selection and temperature of the mold also act in determining the appropriate clearance value. The rectangular slots are inclined to the centerline of the mold. The direction of this inclination is directly related to the orientation of the re-entrant surface, such that the direction in which the slide bar projection must be moved will allow the slide bar projection to clear the re-entrant surface of the injection molded polymeric part. If the re-entrant surface faces downwardly towards the centerline of the mold, the rectangular slots are also inclined towards the centerline. On the other hand, if the re-entrant surfaces face away from the centerline, the rectangular slots are inclined away from the centerline. Typical angle of inclination is in the range of 1 to 45 degrees, and more preferably in the range of 10-15 degrees.

Generally stated, the present invention relates to a polymeric injection mold with retractable slide bars for producing re-entrant molded surfaces on both sides of the parting line. In one embodiment, a polymeric frame having re-entrant surfaces on both its upper and lower portions and on both sides of the parting line is injection molded in a single step without elaborate multiple steps of removing additional cam action bars that define the re-entrant surfaces. The polymeric injection mold of the present invention has retractable slide bar projections inserted in both the stationary 'A' side of the injection mold and the movable 'B' side of the injection mold. The slide bar projections are permanently attached to the slide bars, which pass through rectangular slots in the stationary part and the movable part, respectively, of the mold. The clearance between the slide bars and the corresponding rectangular slot in the mold is generally small, typically 0.0005" to 0.001", so that the injected polymer does not leak through, but the clearance is large enough to allow for the free movement of the slide bars within the rectangular slots. The rectangular slots are inclined to the mold at a preferred angle of 10 to 15 degrees with an orientation that matches the orientation of the re-entrant surface. As a result, the movement of the slide bars within the rectangular slots displaces the slide bar projections in a direction such that the slide bar projections will clear the re-entrant surfaces in the molded polymeric part.

When the polymer is injected into the closed polymeric injection mold, the retractable slide bar projections are positioned at appropriate locations to define the re-entrant surfaces on both sides of the parting line of the mold. The injected polymer is allowed to cool and harden. The movable side of the injection mold is withdrawn first. Pull bars are rigidly attached to the movable side of the mold and are removably attached to the slide bars within the stationary side of the mold. The withdrawal of the movable side of the mold therefore simultaneously pulls the slide bars within the stationary side of the mold that are inclined to the centerline of the mold so that the slide bar projections clear the re-entrant surfaces on the A side of the injection molded polymeric part. At this stage, the polymeric injection molded part is now attached to the movable part of the mold but is separated from the stationary part of the mold because the slide bar projections on the stationary side of the mold have cleared the re-entrant surfaces of the injection molded part.

Next, the ejection sequence is activated which essentially actuates an ejector plate in order to push the slide bars on the movable side of the mold. This pushing action causes the slide bars to move within the rectangular slots in order to withdraw the slide bar projections on the movable side of the mold from the re-entrant surfaces of the injection molded polymeric part. The functionality of this step of the process is similar to that used in the stationary part of the mold. The slide bars pass through the rectangular slots in the movable side of the mold at an inclination to the centerline, thereby displacing the slide bar projections in the movable part of the mold clearing the re-entrant surfaces. At this stage, the polymeric injection molded part is free from both the stationary side and the movable side of the mold, and can therefore be removed.

Significant advantages are realized by practice of the present invention. The key features of the polymeric injection mold with retractable bars for producing re-entrant molded surfaces include, in combination, the features set forth below:

a) a mold having a cavity defining the shape of a polymeric molded part to be molded;

b) the mold cavity having tapered mold surfaces for easy release of the molded part;

c) the polymeric molded part having one or more re-entrant surfaces on both sides of the parting line;

d) the re-entrant surface molding process being enabled by incorporation of a plurality of slide bar projections associated with a stationary 'A side' and a movable 'B side' of the mold;

e) the slide bar projections being rigidly connected to rectangular slide bars;

f) the slide bars passing through inclined rectangular slots in the 'A side' and 'B side' of the mold, such slots being inclined at a preferred angle of 10 to 15 degrees with respect to the centerline of the mold;

g) the slide bars passing through inclined rectangular slots in the 'A side' and 'B side' of the mold, such slots with a preferred clearance of 0.0005 to 0.001 inches;

h) the slide bars on the 'A side' of the mold being removably connected to pull bars that are rigidly attached to the movable 'B side' of the mold;

whereby said mold is parted after injection molding by moving the 'B side' of the mold away from the 'A side' of the mold, the movement of the 'B side' of the mold simultaneously moving the pull bars and sliding the slide bars on the 'A side' of the mold along the inclined slots to move the slide bar projections laterally with respect to the re-entrant surfaces and clear the re-entrant lip edges on the 'A side' of the mold; and i) the slide bars on the 'B side' of the mold being subsequently moved along the inclined slots after actuating an ejector plate thereby releasing the slide bar projections from the re-entrant lip edges on the 'B side' of the mold, to permit discharge of the molded polymeric part completely from the mold.

BRIEF DESCRIPTION OF THE DRAWINGS

The invention will be more fully understood and further advantages will become apparent when reference is had to the following detailed description of the preferred embodiments of the invention and the accompanying drawings, in which.

DETAILED DESCRIPTION OF THE INVENTION

Injection molding of polymeric components is easily accomplished by injecting a molten polymer into a mold which has two mating mold halves with a parting line there between. The polymer from the injection molding machine is injected through one half of the mold, which is rigidly attached to the injection molding machine, called the 'A' side or the stationary part of the mold. The other side of the mold, the 'B' side or the movable part of the mold is movable, wherein the subsequent separation of the mold and actuation of a knock-out plate allows removal of the injection molded polymeric part. The injection mold is typically designed with each surface of the molded part tapered so that the molded part separates easily at the end of molding operation from the mold cavity. Typically, this separation generally requires that the interior surfaces of the mold are not re-entrant. However, there are circumstances when the injection molded polymeric part requires re-entrant surfaces, and therefore the mold cannot be parted without destroying these re-entrant surfaces of the molded part in the process.

Generally, re-entrant surfaces are formed by inserting shaped slide bars at specific locations within the mold. The slide bars are first removed laterally by withdrawing them through a cavity within the mold prior to the parting of the side A and side B of the mold. This movement of the slide bar requires mechanical or hydraulic actions to slide and remove the slide bars. The slide bars are generally present in the movable part of the mold and not in the stationary part of the mold due to mechanical or hydraulic actions required at the stationary part of the mold adjacent and connected to the injection molding machine. Schemes for easily producing re-entrant surfaces in an injection molded polymeric part which has re-entrant surfaces on both sides of the parting line has not been possible due to mechanical or hydraulic actions needed for removing the slide bars. The removal of mold bars laterally may require the presence of appropriate cavities in the mold and complex tooling to insert and remove the mold bars.

The polymeric injection mold of the present invention has retractable slide bar projections inserted in both the stationary 'A' side of the injection mold and the movable 'B' side of the injection mold. The slide bar projections are permanently attached to the slide bars, which pass through slots in the stationary and movable parts, respectively, of the mold. Preferably, the slots are rectangular. Alternatively, the slots are oblong, oval-shaped, round, triangular, or the like. The clearance between the slide bars and the corresponding rectangular slot in the mold is generally small, typically 0.0005" to 0.001", so that the injected polymer does not leak through, but the clearance is large enough to allow for the free movement of the slide bars within the rectangular slots. The rectangular slots are inclined to the mold at a preferred angle of 10 to 15 degrees, with an orientation that matches the orientation of the re-entrant surface. As a result, the movement of the slide bars within the rectangular slots displaces the slide bar projections in a direction such that the slide bar projections will clear the re-entrant surfaces in the molded polymeric part.

When the polymer is injected into the closed polymeric injection mold, the retractable slide bar projections are positioned at appropriate locations to define the re-entrant surfaces on both sides of the parting line of the mold. The injected polymer is allowed to cool and harden. The movable side of the injection mold is withdrawn first. Pull bars are rigidly attached to the movable side of the mold and are removably attached to the slide bars within the stationary side of the mold. The withdrawal of the movable side of the mold therefore simultaneously pulls the slide bars within the stationary side of the mold that are inclined to the centerline of the mold so that the slide bar projections clear the re-entrant surfaces on the A side of the injection molded polymeric part. At this stage, the polymeric injection molded part is now attached to the movable part of the mold but is separated from the stationary part of the mold because the slide bar projections on the stationary side of the mold have cleared the re-entrant surfaces of the injection molded part.

Next, the ejection sequence is activated which essentially actuates an ejector plate, or other pushing means, in order to push the slide bars on the movable side of the mold. Preferably, the pushing means comprises a "knock out" or ejector plate 31 having a sliding surface. This pushing action causes the slide bars to move within the rectangular slots in order to withdraw the slide bar projections on the movable side of the mold from the re-entrant surfaces of the injection molded polymeric part. The functionality of this step of the process is similar to that used in the stationary part of the mold. The slide bars pass through the rectangular slots in the movable side of the mold at an inclination to the centerline, thereby displacing the slide bar projections in the movable part of the mold clearing the re-entrant surfaces. At this stage, the polymeric injection molded part is free from both the stationary side and the movable side of the mold, and can therefore be removed.

Generally stated, the present invention relates to a polymeric injection mold with, retractable slide bars for producing one or more re-entrant molded surfaces on both sides of the parting line. In one embodiment, a polymeric frame having re-entrant surfaces on both its upper and lower portions and on both sides of the parting line is injection molded in a single step without elaborate multiple steps of removing various cam actions that define the re-entrant surfaces.

Figure 1:
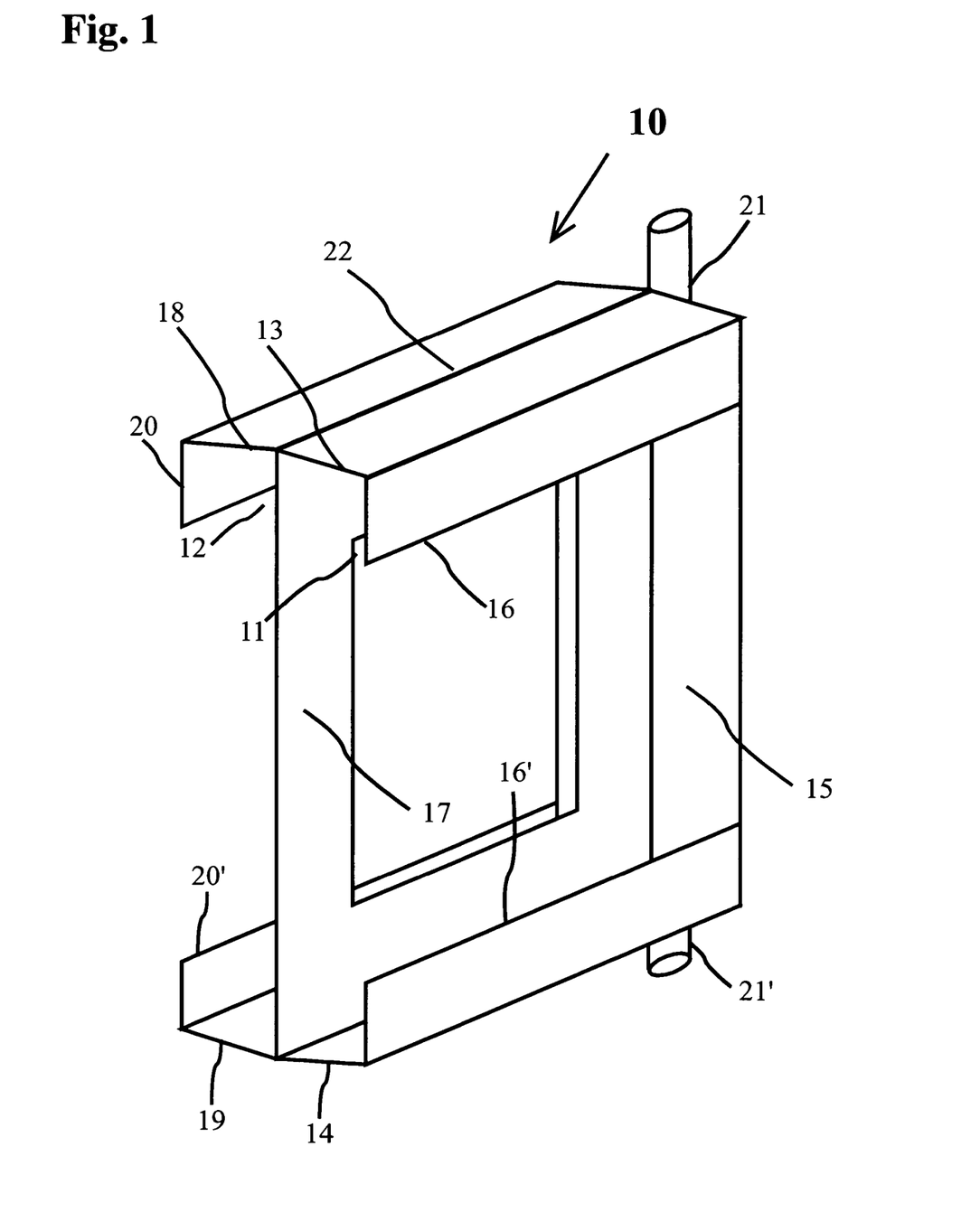
FIG. 1 is a schematic representation of an injection molded polymeric part having re-entrant surfaces on both sides of the parting line, herein called a 'page frame', commonly used to display samples of floor coverings and ceiling tiles, and the like, in home building supply stores.

FIG. 1 is a schematic diagram of the injection molded polymeric part of one embodiment of the present invention, shown generally at 10. Part 10, herein called a 'page frame', is commonly used to display samples of floor coverings and ceiling tiles, and the like, in home building supply stores. This injection molded polymeric part comprises two channeled openings 11 and 12 appointed for insertion of samples of floor coverings and ceiling tiles. Channel opening 11 is defined by three retaining edges 13, 14, and 15, as well as a separator 17 and top and bottom securing lips 16, 16'. Similarly, channel opening 12 is defined by three retaining edges 18, 19, and an edge similar to 15 but on the other side of the separator 17 (thus hidden). The channel opening 12 also has top and bottom securing lips 20, 20'. The back wall 15 carries two pins 21, 21' which are molded permanently there within. These pins 21, 21' are used to anchor the 'page frame' (and the samples of floor coverings and ceiling tiles associated therewith) in a multiple hole receiving cradle so that customers can "flip" through various tiles while shopping at a home building supply store and make a selection.

The general design of the polymeric 'page frame' shown in FIG. 1 requires the injection molding of re-entrant securing lips 16, 16', 20 and 20', which are on the upper and lower portion of the injection molded polymeric part and are located on both sides of the parting line 22. These surfaces have to be defined by bars inserted within the mold cavity and have to be removed prior to parting of the mold. In conventional processing, these bars are typically inserted from the side of the mold; however, their long length requires large hydraulic cylinders to pull the cam attached to the sides of the mold. This requirement is not easily accomplished since the mold is movable and the bar handling machinery is generally rigidly mounted. The methodology of the subject invention solves this problem by using a slide bar that passes through an inclined rectangular slot in the mold, which carries slide bar projections that define these re-entrant surfaces. In this example, the re-entrant surfaces require the movement of the slide bar projections towards the centerline of the mold. If the re-entrant surfaces face the opposite direction, the inclination angle of the rectangular slots in the mold will be in the opposite direction. In either case, the movement of the slide bars within the rectangular slots is designed so that the slide bar projections clear the re-entrant surfaces of the polymeric part.

Polymeric injection molding of part 10 is accomplished so that the line at 22 represents the location of the parting line, the line along which the two sections of the mold meet. The surfaces of retaining edges at 13, 14, 18 and 19 are tapered as shown. With this construction, the mold, having a parting line at 22, can part or separate easily, thereby facilitating separation of part 10 from the mold. However, the presence of securing lips at 16, 16', 20, and 20' prevent this separation since these lips are re-entrant surfaces that point away from the parting line such that the mold sections cannot be separated without removing the mold bars that define these re-entrant surfaces. Typically this re-entrant surface of securing lips extends from 0.5 to 1.0 inches from the edge surface, although other ranges, such as 0 to any length, are well within the scope of the present invention. Conventionally, re-entrant surfaces such as 16, 16', 20, and 20' are molded by inserting slide bar projections within the injection mold that define these surfaces. These slide bar projections must then be removed prior to the parting of the mold. This may require the presence of appropriate cavities in the mold as well as mechanical or hydraulic actions to insert the bars after mold closure and to remove them after the completion of the molding operation, but prior to mold separation. One example of such a bar withdrawal arrangement would require a cam action tool using hydraulic cylinders to pull slides from two (2) different surfaces, both vertically (to release the re-entrant surfaces) and horizontally (to release the rectangular hole in the center of the 'page frame' [shown in FIG. 1]). This is not easily accomplished in the stationary part of the mold due to space restrictions. Furthermore, this complex tooling is costly, cumbersome, and prone to mechanical or hydraulic failure because of its large number of moving parts.

Figure 2A:
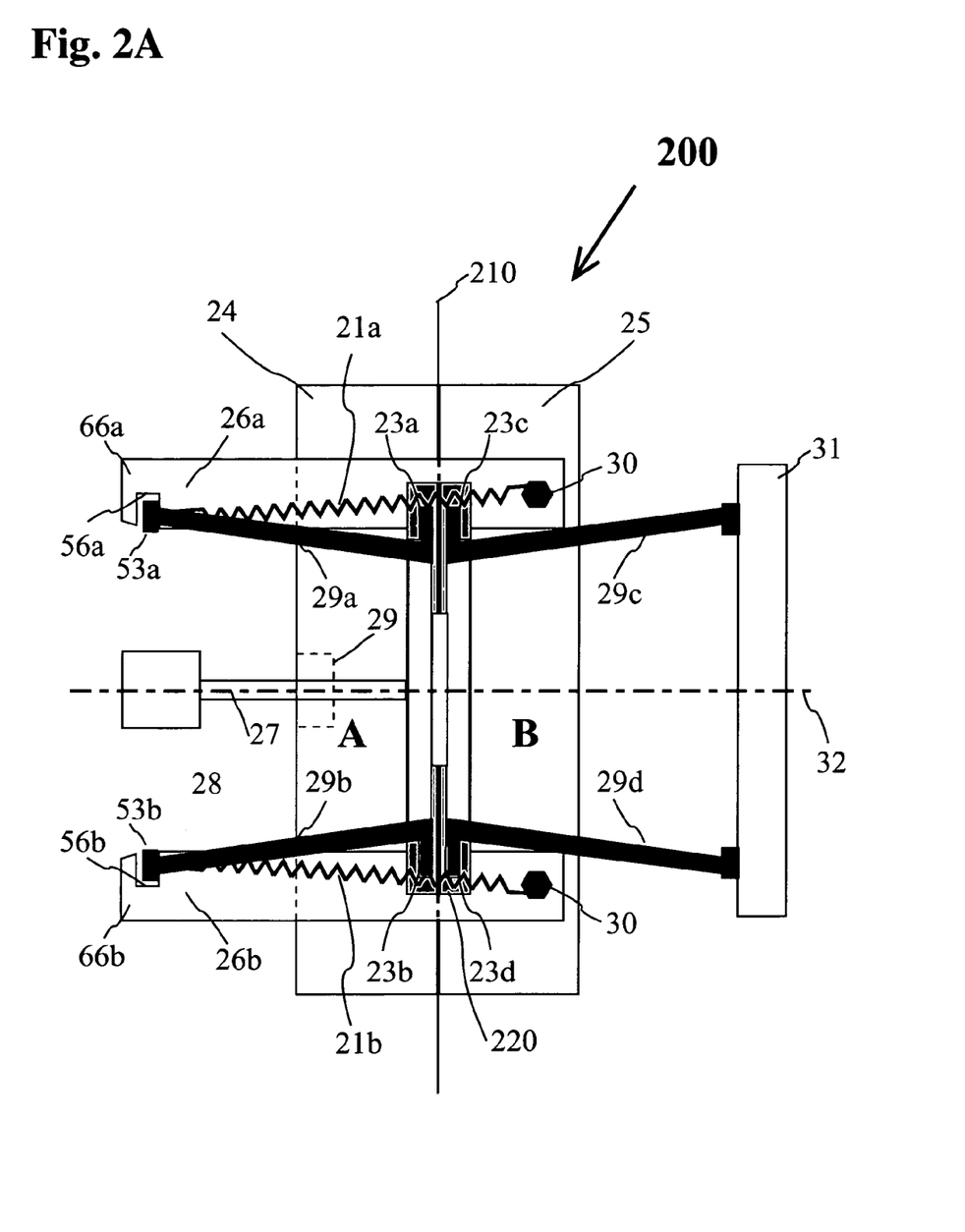
FIG. 2A is a schematic illustration of a page frame injection mold closed just prior to injection molding of the polymer with four slide bar projections defining re-entrant surfaces in the stationary side A of the mold portion and in the removable side B of the mold portion.
Figure 2B:
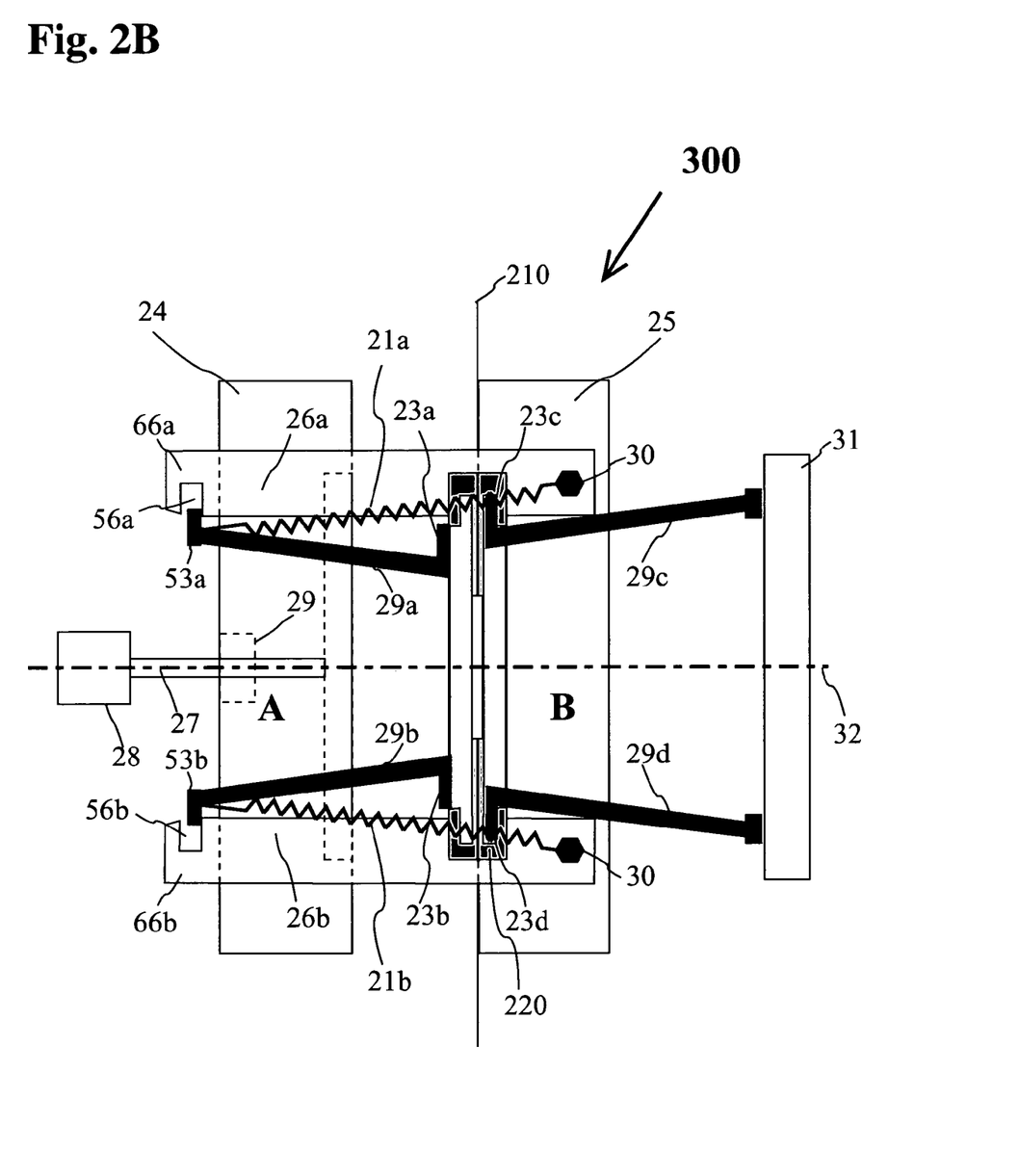
FIG. 2B is a schematic illustration of the page frame injection mold with the side B of the injection mold withdrawn, activating the withdrawal of the slide bar projections in the side A of the injection mold.
Figure 2C:
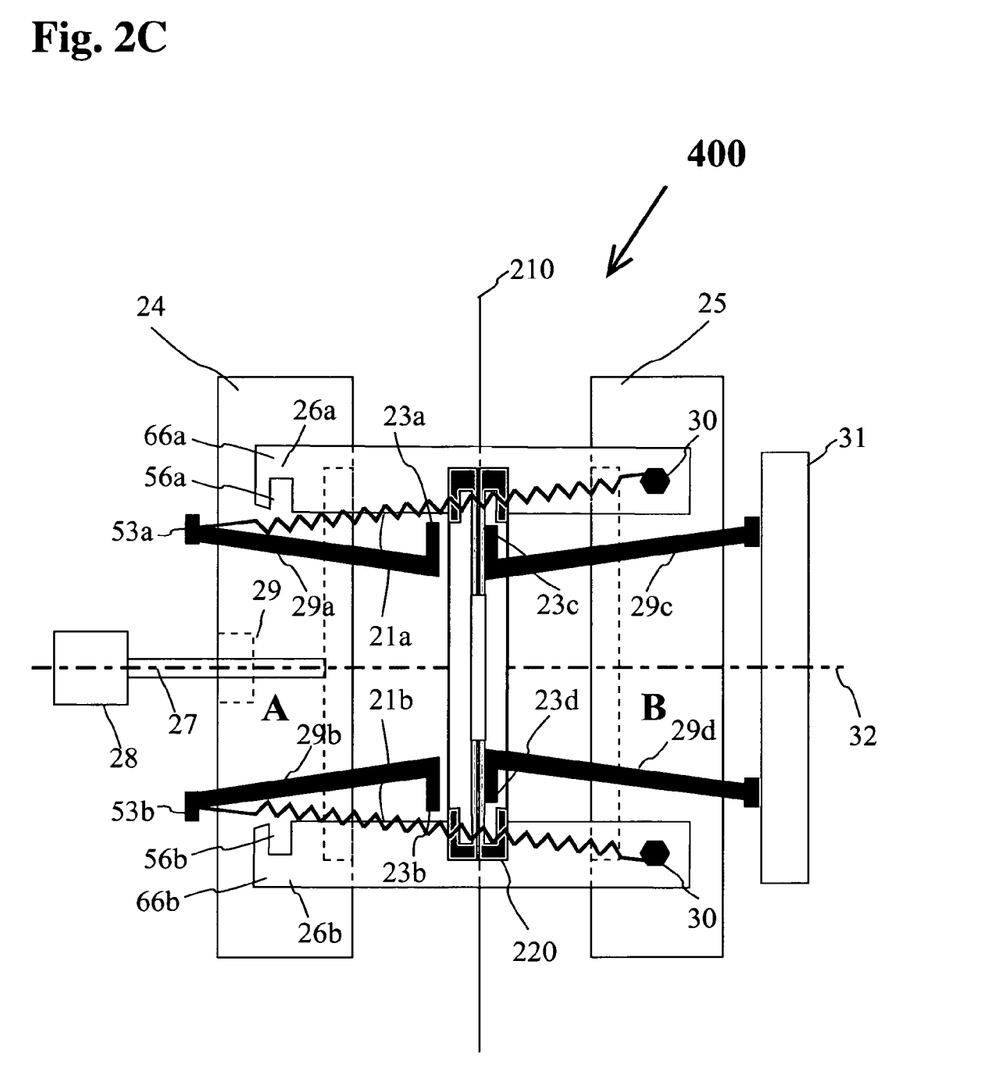
FIG. 2C is a schematic illustration of the page frame injection mold with the ejector plate activated, thereby withdrawing the slide bar projections in the side B of the injection mold.

The subject invention provides a novel solution to this difficult problem. The side A of the mold is defined as the side of the mold being rigidly attached to the injection molding machine and is therefore not movable. The side B of the mold is defined as the side of the mold being free to move during the parting process. Both side A of the mold and side B of the mold are provided with a pair of rectangular slots which are inclined at a preferred angle of 10-15 degrees with respect to a horizontal plane represented by the mold centerline at 32, as shown in FIGS. 2A, 2B, and 2C. Rectangular slide bars 29a and 29b slide through rectangular slots in side A of the mold; and rectangular bars 29c and 29d slide through rectangular slots in side B of the mold. The clearance between the slide bars and the rectangular slot is preferably between 0.0005 inches to 0.001 inches, preventing entry of injection molded polymer into this clearance, while still permitting free movement of slide bars within the rectangular slots during and after the molding operation. The slide bars 29a, 29b, 29c and 29d have projections 23a, 23b, 23c and 23d, respectively, and define the surface of the re-entrant securing lips 16, 16', 20 and 20' of the molded polymeric 'page frame'. Means are provided to remove the slide bar projections from the re-entrant surfaces of the polymeric injection molded part during the separation of the stationary and movable part of the mold.

FIG. 2A schematically illustrates the injection mold 200 of the 'page frame' with the mold closed just prior to injection molding of the polymer. The mold of the 'page frame' has two sections, wherein the section marked 'A' side is rigidly attached to the injection molding machinery and therefore is unmovable. The mating section of the mold is the 'B' side, which is moved to part the sections and remove the molded page frame. The subject invention provides a method and means for the insertion of four slide bar projections 23a, 23b, 23c and 23d two of which are located in the 'A side' and two of which are located in the 'B side' of the mold, respectively, creating the re-entrant surfaces 16, 16', 20 and 20' (FIG. 1) in the polymeric injection molded part. The slide bar projections 23a, 23b, 23c and 23d are attached to rectangular slide bars 29a, 29b, 29c and 29d, respectively. Rectangular slide bars 29a and 29b are slidably inserted at a preferred angle of 10-15 degrees with respect to the mold centerline 32 into the side A of the mold through rectangular slots with a preferred clearance of 0.0005 to 0.001 inches. In a similar manner, slide bars 29c and 29d are slidably inserted at a preferred angle of 10-15 degrees into the rectangular slots in side B of the mold with a preferred clearance of 0.0005 to 0.001 inches. The injected polymer does not penetrate the clearance space due to the small clearance values selected, as well as the polymeric material selections and the temperature of the mold, yet the slide bars can be translated in the side A and side B of the mold freely.

The mold parting line is shown at 210 and the mold cavity is shown at 220. A polymer is injected into the cavity from a plasticizer unit 28 through a sprue bushing 29 from the nozzle 27. The side of the mold through which the polymer is injected is defined as the 'A side' of the mold and is referenced by numeral 24. The 'A side' of the mold 24 is fixed relative to the platen of the injection machine (not shown) and remains stationary throughout the molding process. The 'B side' of the mold 25 is translated as the mold opens to permit removal of the molded polymeric part from the mold cavity. Inside the mold, the four slide bar projections 23a, 23b, 23c, 23d, are operative to create the re-entrant lip edges 16, 16', 20, 20' of the page frame, as shown in FIG. 1. The slide bar projections 23a, 23b, 23c, 23d are permanently attached to four rectangular cross section slide bars 29a, 29b, 29c, 29d, respectively, which are inclined to the mold centerline 32 at a preferred angle of 10 to 15 degrees, and by way of example at an angle of 12 degrees with respect to the mold centerline 32. The two slide bars 29a, 29b on the 'A side' of the mold are removably attached to four pull bars 26a, 26a', 26b, 26b' (two along the outside of one edge of the mold and two along the outside of the opposite edge of the mold [26a' and 26b' not shown]). At one of their ends, the pull bars 26a, 26a', 26b, 26b' are rigidly attached at 30 to the mold body of the 'B side' of the mold 25. The other ends of the pull bars 56a, 56a', 56b and 56b' capture the slide bars 29a and 29b, at 56a, 56a', 56b and 56b' using slide bar ends 53a and 53b. A first spring 21a is attached to 53a and 30, and a second spring 21b is attached to 53b and 30. Not shown is a third spring and a fourth spring, on the other side of the mold. When the mold is closed, the slide bar projections 23a, 23b, 23c, 23d are located within the mold cavity producing the re-entrant surfaces of the polymeric molded part.

FIG. 2B illustrates at 300 the position of the mold after the injected polymer has hardened and the 'B side' of the mold shown at 25 has been pulled open to initiate the mold separation process. Since the 'B side' of the mold is rigidly attached at 30 to the pull bars 26a, 26a', 26b, 26b', when the mold opens, the 'B side' of the mold "pulls" the pull bars along at the same velocity and direction in which the 'B side' of the mold travels. Since the other ends of the pull bars 26a, 26a', 26b, 26b' are removably attached to the slide bar ends at 56a, 56a', 56b, 56b', the slide bar projections 23a, 23b are pushed laterally, relative to the inside of re-entrant channel 11 of the part 10 along the 'A side' of the mold. This movement of the pull bars 26a, 26a', 26b, 26b' causes slide bar ends 53a, 53b to be captured within the inclined rectangular notch-like slots 56a, 56a', 56b, 56b', located on ends 66a, 66a', 66b, 66b' of the pull bars 26a, 26a', 26b, 26b'. The side A of the mold as shown at 24 is not moved. As a result of the incline of the rectangular slots in the A side of the mold, the slide bar projections 23a, 23b progressively move towards the centerline 32 of the mold thereby clearing the re-entrant lip edges 16, 16' of the molded polymeric part 10 and releasing part 10 depicted in FIG. 1 from the 'A side' 24 of the mold. Typical movement required to clear a 0.5 inch re-entrant lip is approximately 2.35 inches when combined with a 12 degree taper of the rectangular slots, respectively. A 1.0 inch re-entrant lip requires a movement of approximately 4.7 inches when combined with a 12 degree taper of the rectangular slots, respectively. The taper angle of the rectangular slots can be in the range of 1 to 45 degrees, depending on the particular configuration of the polymeric part having re-entrant surfaces. The slide bars 29a and 29b also separate from the pull bars at 56a, 56a', 56b and 56b'. However, the spring 21a attached to 53a and 30 as well as the spring 21b attached to 53b and 30 pulls the slide bar further away from the A side of the mold, thereby further moving slide bar projections 23a and 23b towards the centerline 32 of the mold. The springs also operate to maintain the slide bar ends, 53a and 53b, at the appropriate position, so that when the mold closes, the slide bar ends, 53a and 53b, line up appropriately with the rectangular notch-like slots 56a, 56a', 56b, 56b'. At this time, the molded polymeric part 10 is still attached to the movable 'B side' 25 of the mold with the slide bar projections 23c, 23d still in the molding position. Once the slide bars 29a, 29b are completely disengaged from the pull bars 26a, 26a', 26b, 26b', the mold is free to open completely.

In FIG. 2C there is shown generally at 400 the position of the mold after the ejector plate 31 has been actuated. The ejector plate 31 carries on a sliding surface two slide bars 29c, 29d, which are in turn connected to slide bar projections 23c, 23d. The ejector plate 31 essentially displaces the sliding bars 29c, 29d within the 'B side' 25 of the mold, thereby allowing the slide bar projections 23c, 23d within the re-entrant surfaces to move towards the centerline 32 of the mold in a manner similar to the action of slide bar projections 23a, 23b in the 'A side' 24 of the mold. The slide bars 29c, 29d on the 'B side' of the mold are inserted into the second set of inclined rectangular slots at a preferred angle between 10-15 degrees, to the centerline of the mold 32 in the same manner as the insertion of slide bars 29a, 29b into the first set of inclined rectangular slots found in the 'A side' of the mold. As a result of the activation of the ejector plate 31, the molded polymeric part 10 is completely released from the slide bar projections 23c, 23d. The part 10 can then be completely discharged from the molding machine and collected by a machine operator or robot.

The last step of the molding operation involves closing the 'B side' 25 of the mold so that it mates with the 'A side' 24 of the mold. As the mold closes, the inclined rectangular notch-like slots 56a, 56a', 56b, 56b' of the pull bars reengage with ends 53a, 53b, of slide bars 29a, 29b using the assistance of springs 21a, 21b. The springs 21a, 21b hold slide bars 29a, 29b towards the 'B side' 25 of the mold so that the ends 53a, 53b properly line up with the inclined rectangular notch-like slots 56a, 56a', 56b, 56b' of the pull bars. The mold returns to the configuration shown in FIG. 2A, and is ready to accept injected polymer once again, restart the molding process and manufacturer the next part.

Although the present invention is described in view of a 'page frame' part, other types of polymeric parts having at least one re-entrant surface on both sides of the parting line are well within the scope of the present invention. For example, there can be any number of slide bars, slide bar projections, pull bars, slots, and springs in the mold construction depending on the particular configuration of the desired part having at least one re-entrant surface on both sides of the parting line. Generally stated, the number of slide bars/slide bar projections is directly related to the number of re-entrant surfaces. By way of example, the embodiment disclosed in FIGS. 1, 2a, 2b, 2c described herein depicts a polymeric part having four re-entrant surfaces: two on the A side of the mold and two on the B side of the mold. Alternatively, there could be two re-entrant surfaces: one on the A side of the mold and one on the B side of the mold. There could also be three re-entrant surfaces: one on the A side of the mold and two on the B side of the mold, or vice versa. Such alternative types of polymeric parts and mold constructions will be readily apparent to those skilled in the art. In all preferred embodiments, at a minimum, there is at least one re-entrant surface on the A side of the mold, and at least one re-entrant surface on the B side of the mold.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A polymer injection mold for molding a polymeric injection molded part having a parting line with at least one re-entrant surface on both sides of said parting line comprising:
   a. a stationary part of the mold attached to a polymeric injection molding machine;
   b. a movable part of the mold being removably mated with the stationary part of the mold at the parting line;
   c. said stationary part of the mold incorporated with at least one slide bar projection to define re-entrant surfaces of said injection molded polymeric part;
   d. said movable part of the mold incorporated with at least one slide bar projection to define re-entrant surfaces of said injection molded polymeric part;
   e. said slide bar projections rigidly attached to slide bars that pass through slots in side walls of said stationary part and said movable part of the mold, respectively, with a clearance sufficient to prevent leakage of plasticized injected polymer;
   f. each of said slots in side walls of said stationary part of the mold and said movable part of the mold being inclined to mold centerline;
   g. said slide bars passing through a side wall of said stationary part of the mold being removably connected to at least one pull bar, wherein said pull bar is attached on its distal end to said movable part of the mold;
   wherein displacing said movable part of the mold from said stationary part of the mold removes said molded polymeric part from said stationary part of the mold, and pulls said pull bars, thereby pulling said slide bars through said slots of said stationary part of the mold, displacing slide bar projections in a direction relative to said centerline in order to clear re-entrant surfaces of said injection molded polymeric part;
   h. means for pushing slide bars through said slots of said movable part of the mold thereby displacing slide bar projections in a direction relative to said centerline in order to clear re-entrant surfaces of said injection molded polymeric part;
   whereby said injection molded polymeric part with at least one re-entrant surface on both sides of said parting line is produced and removed from the injection mold without damage to said re-entrant surfaces.

2. The polymer injection mold as recited by claim 1, wherein said slots in side walls of said stationary part of the mold and said movable part of the mold are rectangular.

3. The polymer injection mold as recited by claim 1, wherein mold surfaces in said stationary part of the mold and said movable part of the mold comprise tapered surfaces towards said parting line for easy separation of said stationary part of the mold and movable part of the mold releasing said polymeric injection molded part from the injection mold.

4. The polymer injection mold as recited by claim 1, wherein said pushing means comprises an ejector plate, and the ejector plate has a sliding surface.

5. The polymer injection mold as recited by claim 4, wherein said slots are inclined at an angle of 12 degrees with respect to the said centerline of the mold.

6. The polymer injection mold as recited by claim 1, wherein said slots have a clearance of 0.0005" to 0.001" with respect to said slide bars.

7. The polymer injection mold as recited by claim 1, wherein said slots are inclined at an angle of 1 to 45 degrees with respect to said centerline of the mold.

8. The polymer injection mold as recited by claim 1, wherein said slots are inclined at an angle of 10 to 15 degrees with respect to said centerline of the mold.

9. The polymer injection mold as recited by claim 1, wherein said slots are inclined at an angle with respect to said centerline of the mold so as to have the slide bar projections clear the re-entrant surfaces of the injection molded part when the slide bar is displaced through said rectangular slots.

10. The polymer injection mold as recited by claim 1, wherein said slots are inclined at a downward angle with respect to said centerline of the mold and the re-entrant surfaces point towards the centerline of the mold.

11. The polymer injection mold as recited by claim 1, wherein said slots are inclined at an upward angle with respect to said centerline of the mold and the re-entrant surfaces point away from the centerline of the mold.

12. The polymer injection mold as recited by claim 1, wherein said removable connections of said pull bars to said slide bars is a notch and head attachment.

13. The polymer injection mold as recited by claim 1, further comprising at least one spring, wherein said spring is connected at one end to the movable part of the mold and at the other end to the slide bar on the stationary part of the mold.

14. The polymer injection mold as recited by claim 13, wherein there are four springs.

15. The polymer injection mold as recited by claim 1, wherein said injection molded polymeric part is a 'page frame'.

16. The polymer injection mold as recited by claim 1, wherein there are four pull bars removably connected to two slide bars on the stationary part of the mold.

17. The polymer injection mold as recited by claim 1, wherein there are two slide bars within the stationary part of the mold, thereby defining two re-entrant surfaces on that side of the parting line.

18. The polymer injection mold as recited by claim 1, wherein there are two slide bars within the movable part of the mold, thereby defining two re-entrant surfaces on that side of the parting line.

* * * * *